(12) United States Patent
Huang et al.

(10) Patent No.: US 12,345,975 B2
(45) Date of Patent: Jul. 1, 2025

(54) DISPLAY MODULE AND ELECTRONIC APPARATUS

(71) Applicants: K-TRONICS (SUZHOU) TECHNOLOGY CO., LTD., Suzhou (CN); BOE TECHNOLOGY GROUP CO., LTD., Beijing (CN)

(72) Inventors: Wei Huang, Beijing (CN); Zhaoxi Yu, Beijing (CN); Shu Zhang, Beijing (CN); Ze Jin, Beijing (CN); Yu Zhao, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 187 days.

(21) Appl. No.: 18/015,974

(22) PCT Filed: Sep. 8, 2021

(86) PCT No.: PCT/CN2021/117186
§ 371 (c)(1),
(2) Date: Jan. 13, 2023

(87) PCT Pub. No.: WO2022/089022
PCT Pub. Date: May 5, 2022

(65) Prior Publication Data
US 2024/0036384 A1    Feb. 1, 2024

(30) Foreign Application Priority Data
Oct. 30, 2020   (CN) .......................... 202011194256.2

(51) Int. Cl.
G02F 1/1333    (2006.01)
G02F 1/1335    (2006.01)

(52) U.S. Cl.
CPC .. *G02F 1/133331* (2021.01); *G02F 1/133317* (2021.01); *G02F 1/13338* (2013.01);
(Continued)

(58) Field of Classification Search
None
See application file for complete search history.

(56) References Cited

U.S. PATENT DOCUMENTS 8,854,803 B2   10/2014  Huang
9,274,625 B2   3/2016   Wilson
(Continued)

FOREIGN PATENT DOCUMENTS

CN   102653333 A   9/2012
CN   205899447 U   1/2017
(Continued)

OTHER PUBLICATIONS

Written Opinion from PCT/CN2021/117186 dated Dec. 16, 2021.
(Continued)

*Primary Examiner* — Phu Vu
(74) *Attorney, Agent, or Firm* — Calfee, Halter & Griswold LLP

(57) ABSTRACT

A display module and an electronic apparatus. The display module may comprise: a display panel, which is provided with a display area and a non-display area arranged around the display area; a cover plate, which is located at the display side of the display panel, wherein the cover plate has a light-shielding area; and a bonding structure, which is located between the display panel and the cover plate, and two opposite surfaces of the bonding structure in a thickness direction are respectively bonded to the display panel and the cover plate. The bonding structure comprises a buffer layer; an orthographic projection of the bonding structure on a reference plane is at least partially overlapped with an (Continued)

orthographic projection of the non-display area on the reference plane, and is at least partially overlapped with an orthographic projection of the light-shielding area on the reference plane.

11 Claims, 3 Drawing Sheets

(52) U.S. Cl.
CPC .. *G02F 1/133512* (2013.01); *G02F 1/133528* (2013.01); *G02F 2202/28* (2013.01)

(56) References Cited

U.S. PATENT DOCUMENTS

| | | |
|---|---|---|
| 2012/0188743 A1 | 7/2012 | Wilson |
| 2012/0222807 A1 | 9/2012 | Huang |
| 2021/0026590 A1* | 1/2021 | Nam .................. B60K 35/60 |
| 2021/0149239 A1* | 5/2021 | Li .................... G06F 1/1637 |

FOREIGN PATENT DOCUMENTS

| | | |
|---|---|---|
| CN | 108181758 A | 6/2018 |
| CN | 210136491 U | 3/2020 |
| CN | 210514868 U | 5/2020 |
| CN | 211149136 U | 7/2020 |
| CN | 214409495 U | 10/2021 |

OTHER PUBLICATIONS

International Search Report from PCT/CN2021/117186 dated Dec. 16, 2021.
Office action from Chinese Application No. 202011194256.2 dated Apr. 14, 2023.

\* cited by examiner

DISPLAY MODULE AND ELECTRONIC APPARATUS

CROSS REFERENCE

The present disclosure is based upon International Application No. PCT/CN2021/117186, filed on Sep. 8, 2021, which is based upon and claims priority to Chinese Patent Application No. 202011194256.2, filed on Oct. 30, 2020, entitled "Display Module and Electronic Apparatus", the entire contents of which are incorporated herein by reference in its entirety.

TECHNICAL FIELD

The present disclosure relates to the field of display technology, and in particular, to a display module and an electronic apparatus.

BACKGROUND

With the rapid development of display technology, the demand for commercial display is also showing explosive growth, and pursuit of end customers for product picture quality is getting higher and higher. The perfect image quality without color halo and ghosting is required. However, such products currently have disadvantages of complex manufacturing process and high cost.

It should be noted that the information disclosed in the above Background section is only for enhancement of understanding of the background of the present disclosure, and therefore may contain information that does not form the prior art that is already known to a person of ordinary skill in the art.

SUMMARY

The present disclosure provides a display module and an electronic apparatus.

The first aspect of the present disclosure provides a display module, including:
- a display panel, having a display area and a non-display area arranged around the display area;
- a cover plate, located on a display side of the display panel, wherein the cover plate has a light-shielding area; and
- a bonding structure, located between the display panel and the cover plate, and two opposite sides of the bonding structure in a thickness direction are respectively bonded to the display panel and the cover plate, wherein the bonding structure includes a buffer layer, an orthographic projection of the bonding structure on a reference plane at least partially overlaps with an orthographic projection of the non-display area on the reference plane, and at least partially overlaps with an orthographic projection of the light-shielding area on the reference plane, and the reference plane is a plane perpendicular to the thickness direction of the display panel.

In an exemplary embodiment of the present disclosure, the orthographic projection of the bonding structure on the reference plane is located within the orthographic projection of the light-shielding area on the reference plane.

In an exemplary embodiment of the present disclosure, a thickness of the bonding structure is 0.4 mm to 2.0 mm.

In an exemplary embodiment of the present disclosure, the thickness of the bonding structure is 0.8 mm to 1.0 mm.

In an exemplary embodiment of the present disclosure, a thickness of the cover plate is smaller than 4.5 mm.

In an exemplary embodiment of the present disclosure, the thickness of the cover plate is smaller than 3.5 mm.

In an exemplary embodiment of the present disclosure, the buffer layer is a first buffer foam.

In an exemplary embodiment of the present disclosure, a Shore hardness of the first buffer foam is 30 degrees to 80 degrees.

In an exemplary embodiment of the present disclosure, a Shore hardness of the first buffer foam is 40 degrees to 60 degrees.

In an exemplary embodiment of the present disclosure, the bonding structure further includes:
- a first adhesive layer, disposed on a side of the first buffer foam close to the display panel, and bonded with the display panel;
- a second adhesive layer, disposed on a side of the first buffer foam close to the cover plate, and bonded to the cover plate;
- at least one supporting layer, disposed between the first adhesive layer and the first buffer foam and/or between the second adhesive layer and the first buffer foam.

In an exemplary embodiment of the present disclosure, the supporting layer is disposed between the second adhesive layer and the first buffer foam.

In an exemplary embodiment of the present disclosure, the supporting layer is a polyethylene terephthalate film layer.

In an exemplary embodiment of the present disclosure, a thickness of the supporting layer is 0.04 mm to 0.35 mm.

In an exemplary embodiment of the present disclosure, the buffer layer is a silicon layer, and a Shore hardness of the silicon layer is 40 degrees to 60 degrees, one side of the silicon layer is bonded to the cover plate through an adhesive material, and the silicon layer has a first side surface close to the display area and a second side surface away from the display area;

the bonding structure further includes an optical adhesive bonded to the cover plate and the display panel, and the optical adhesive is bonded to the first side surface and/or the second side surface.

In an exemplary embodiment of the present disclosure, a ratio between a width of the silicon layer and a width of the optical adhesive is 1 to 3.

In an exemplary embodiment of the present disclosure, the cover plate is toughened glass;
the display panel includes a liquid crystal cell and an upper polarizer located on a side of the liquid crystal cell close to the toughened glass,
wherein, a surface of the toughened glass facing the upper polarizer or a surface of the upper polarizer facing the toughened glass is an atomized surface, and a haze of the atomized surface is 15% to 30%.

In an exemplary embodiment of the present disclosure, the bonding structure is disposed around the display area, and the bonding structure, the cover plate and the display panel enclose a cavity, and the cavity is filled with air.

In an exemplary embodiment of the present disclosure, a gap between the bonding structure and the display area is 0 to 2 mm.

In an exemplary embodiment of the present disclosure, a gap between the bonding structure and the display area is 0.5 mm to 1.5 mm.

In an exemplary embodiment of the present disclosure, a width of the bonding structure is 4 mm to 15 mm.

In an exemplary embodiment of the present disclosure, the width of the bonding structure is 6 mm to 8 mm.

The second aspect of the present disclosure provides an electronic apparatus, including:

any one of the display modules described above;

a border, arranged around edges of the display module, wherein the border has an accommodation cavity and a light inlet-outlet, the light inlet-outlet is located at a side of the accommodation cavity close to the cover plate and in communication with the accommodation cavity, and the light inlet-outlet is located at a light emitting side of the cover plate; and an infrared touch component, located in the accommodating cavity, wherein the infrared touch component receives or emits infrared light through the light inlet-outlet.

In an exemplary embodiment of the present disclosure, first limiting grooves are respectively provided on two opposite wall surfaces of the accommodating cavity in the thickness direction;

second limiting grooves are respectively provided on two opposite wall surfaces of the light inlet-outlet in the thickness direction;

opposite two ends of the infrared touch component in the thickness direction are respectively inserted into the first limiting grooves;

the electronic apparatus further includes a filter strip, and opposite two ends of the filter strip in the thickness direction are respectively inserted into the second limiting grooves.

In an exemplary embodiment of the present disclosure, the electronic apparatus further includes:

a pressing sheet, located on a side of the cover plate close to the display panel and supporting the light-shielding area, wherein the pressing sheet is connected with the border, and a gap exists between the pressing sheet and the display panel;

a backlight component, located on a side of the display panel and the pressing sheet away from the cover plate, wherein the backlight component is connected with the border;

a rubber frame, located between the backlight component and the display panel, wherein the rubber frame includes a first part, a second part located on a side of the first part close to the display panel, and a transition part connecting the first part and the second part, the first part is supported on the backlight component, and an orthographic projection of the second part on the reference plane is located within an orthographic projection of the non-display area on the reference plane, and a gap exists between the second part and the backlight component;

a second buffer foam, wherein two opposite sides of the second buffer foam in the thickness direction respectively contact with the display panel and the second part;

a rear case, located on a side of the backlight component away from the display panel, and connected with the border.

It should be noted that the above general description and the following detailed description are merely exemplary and exemplary and should not be construed as limiting of the present disclosure.

BRIEF DESCRIPTION OF THE DRAWINGS

The accompanying drawings, which are incorporated in and constitute a part of this specification, illustrate embodiments consistent with the disclosure and serve to explain the principles of the disclosure together with the description. The drawings in the following description are only some embodiments of the present disclosure, and for those of ordinary skill in the art, other drawings can also be obtained from these drawings without creative effort.

DETAILED DESCRIPTION

Figure 1:
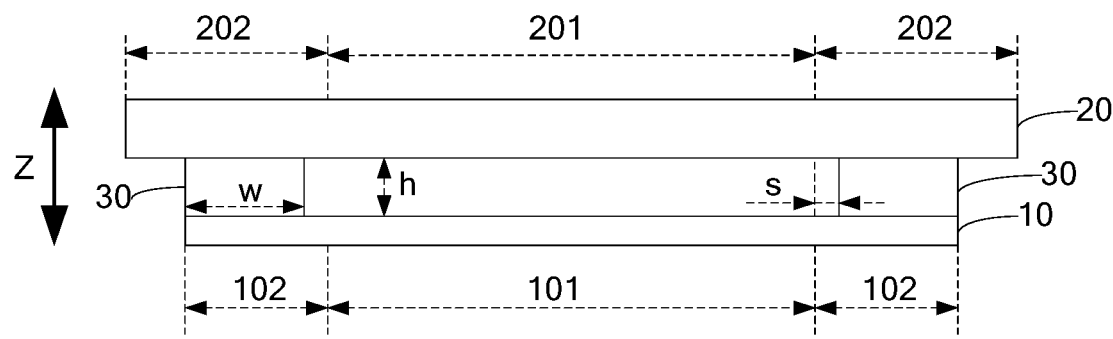
FIG. 1 shows a schematic structural diagram of a display module according to an embodiment of the present disclosure.

Example embodiments will now be described more fully with reference to the accompanying drawings. Example embodiments, however, can be embodied in various forms and should not be construed as limited to the embodiments set forth herein; rather, these embodiments are provided so that this disclosure will be thorough and complete, and will fully convey the concept of example embodiments to those skilled in the art. The same reference numerals in the drawings denote the same or similar structures, and thus their detailed descriptions will be omitted.

Although relative terms such as "on" and "below" are used in this specification to describe the relative relationship of one component of an icon to another component, these terms are used in this specification only for convenience, such as according to the direction of the example described in the drawings. It will be appreciated that if the device of the icon is turned upside down, the components described as "on" will become the components on "below". When a certain structure is "on" other structures, it may mean that a certain structure is integrally formed on other structures, or that a certain structure is "directly" arranged on other structures, or that a certain structure is "indirectly" arranged on another structure through another structure.

The terms "a", "an", "the", "said" are used to indicate the presence of one or more elements/components/etc.; the terms "including" and "having" are used to indicate open-ended inclusive means and means that additional elements/components/etc. may be present in addition to the listed elements/components/etc.; the terms "first", "second", etc. are used only as labels, not to limit the numbers of the objects.

In addition, unless otherwise expressly specified and limited, the terms "assembled", "connected" and "communicated" should be understood in a broad sense, for example, it may be a fixed connection, a detachable connection, or an integral connection. For those of ordinary skill in the art, the specific meanings of the above terms in this document can be understood according to specific situations.

As shown in FIG. 1, an embodiment of the present disclosure provides a display module, which may include a display panel 10, a cover plate 20 and a bonding structure 30.

Figure 2:
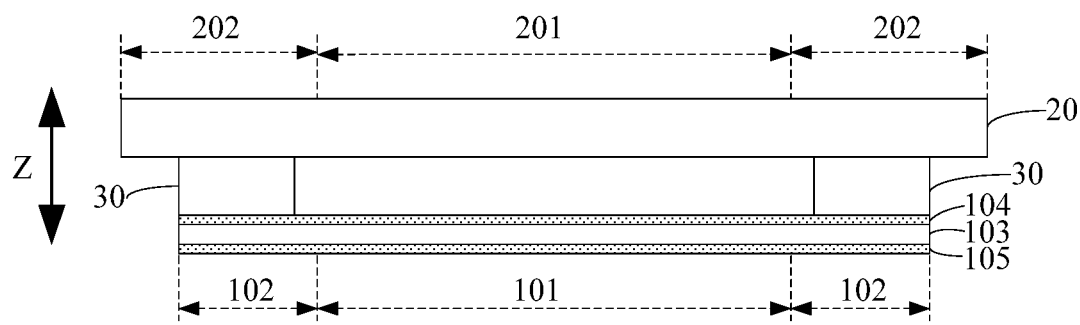
FIG. 2 shows a schematic structural diagram of a display module according to another embodiment of the present disclosure.

The display panel 10 may have a display area 101 and a non-display area 102 disposed around the display area 101. For example, the display panel 10 may be a liquid crystal panel. Specifically, as shown in FIG. 2, the liquid crystal panel may include a liquid crystal cell 103, and an upper polarizer 104 and a lower polarizer 105 respectively located on opposite sides of the liquid crystal cell 103 in the thickness direction Z of the display panel 10.

The cover plate 20 may be located on the display side of the display panel 10. Specifically, as shown in FIG. 2, the cover plate 20 may be located on the side of the upper polarizer 104 away from the liquid crystal cell 103. The cover plate 20 may have a light-transmitting area 201 and a light-shielding area 202. The orthographic projection of the light-transmitting area 201 on the reference plane at least covers the orthographic projection of the display area 101 of the display panel 10 on the reference plane, and the orthographic projection of the light-shielding area 202 on the reference plane at least covers the orthographic projection of the non-display area 102 of the display panel 10 on the reference plane.

Specifically, while the orthographic projection of the light-transmitting area 201 on the reference plane covers the orthographic projection of the display area 101 of the display panel 10 on the reference plane, it may also cover part of the non-display area 102. That is, part of the non-display area 102 may be exposed. For example, the width of the exposed non-display area 102 is greater than about 1 mm. The light-shielding area 202 of the cover plate 20 may be a black silk-screen area, i.e., an area coated with ink.

It should be noted that the reference plane mentioned in the present disclosure is a plane perpendicular to the thickness direction Z of the display panel 10.

In the embodiment of the present disclosure, the cover plate may have a thin thickness to improve touch precision. For example, the thickness of the cover plate may be smaller than 4.5 mm. Further, the thickness of the cover plate may be smaller than 3.5 mm.

For example, the cover plate 20 of the embodiment of the present disclosure may be toughened glass, and the thickness of the toughened glass may be 3.2 mm, but not limited thereto. The thickness of the toughened glass may also be 4 mm. The Mohs hardness of the toughened glass may be about 7H. In addition, as shown in FIGS. 1 and 2, the edge of the cover plate 20 in the embodiment of the present disclosure may extend beyond the edge of the display panel 10.

As shown in FIG. 1 and FIG. 2, the bonding structure 30 may be located between the display panel 10 and the cover plate 20. The opposite sides of the bonding structure 30 in the thickness direction Z of the display panel 10 are respectively bonded with the display panel 10 and the cover plate 20.

In the embodiment of the present disclosure, the display panel 10 and the cover plate 20 are bonded together by the bonding structure 30, so that they can be assembled with the whole machine as a whole. In this way, compared with the solution in which the display panel 10 and the cover plate 20 are independent of each other (i.e., having no direct connection relationship) and assembled with the whole machine separately, it can simplify the product manufacturing process. Further, compared with the solution in which the display panel 10 and the cover plate 20 are independent of each other (i.e., having no direct connection relationship) and assembled with the whole machine separately, the gap between the display panel 10 and the cover plate 20 in the embodiment of the present disclosure is only related to the thickness of the bonding structure 30 and has nothing to do with the position and assembly of other structures in the whole machine, therefore, in this embodiment, the gap between the cover plate 20 and the display panel 10 can be reduced by reducing the thickness of the bonding structure 30. In this way, it can avoid the ghosting and other problems of the product and improve the display quality, at the same time, it can also reduce the difficulty of production, improve the yield of the product, and facilitate the thinning of the product and the improvement of touch precision.

For example, in order to avoid problems such as ghosting of the product, in the embodiment of the present disclosure, the thickness of the bonding structure shown in FIG. 1 may be 0.4 mm to 2.0 mm. Further, the inventor found through tests that when the thickness h of the bonding structure 30 is 0.8 mm to 1.0 mm, such as 0.8 mm, 0.85 mm, 0.9 mm, 0.95 mm, 1.0 mm, etc., it can avoid the situation that the product is thick due to the large thickness and thus the touch accuracy is poor, it can also avoid that the problem of ghosting and other issues cannot be better solved due to the thin thickness. That is to say, when the thickness h of the bonding structure 30 is in the range of 0.8 mm to 1.0 mm, it is conducive to the realization of light and thin products, and can better avoid problems such as ghosting of the product. The thickness of the bonding structure 30 is the dimension in the thickness direction Z of the display panel 10.

Optionally, in the embodiment of the present disclosure, the orthographic projection of the bonding structure 30 on the reference plane at least partially overlaps with the orthographic projection of the non-display area 102 of the display panel 10 on the reference plane, and at least partially overlaps with the orthographic projection of the shielding area 202 on the reference plane. Further, in the embodiment of the present disclosure, the orthographic projection of the bonding structure 30 on the reference plane is located within the orthographic projection of the non-display area 102 of the display panel 10 on the reference plane, and located within the orthographic projection of the light-shielding area 202 on the reference plane, which can avoid the exposure of the bonding structure 30, affecting the display effect.

When the display panel 10 is a liquid crystal panel, the bonding structure 30 can be located between the upper polarizer 104 and the cover plate 20, specifically between the black border area of the upper polarizer 104 and the light-shielding area 202 of the cover plate 20. It should be understood that the black border area of the upper polarizer 104 is located in the non-display area 102. That is, while the light-shielding area 202 of the cover plate 20 covers the non-display area 102 of the display panel 10, it also covers the black border area of the upper polarizer 104.

Based on the foregoing disclosure, the bonding structure 30 of the embodiment of the present disclosure is only located in a partial area of the display panel 10, i.e., the non-display area 102. Compared with the solution in which the entire surface of the display panel 10 is attached with the cover plate 20, this design does not affect the display, also ensures that the cover plate 20 and the display panel 10 are bonded together, and further reduces the cost since the use of the bonding structure 30 is reduced. Especially for large-scale display products such as electronic whiteboards, it is conducive to mass production.

In addition, in this embodiment, the bonding structure 30 is only disposed in the non-display area 102 of the display panel 10 and bonded with the cover plate 20. Compared with the solution in which the bonding structure 30 is disposed on the entire surface of the display panel 10 and attached with the cover plate 20, the solution of this embodiment can facilitate rework if there is poor bonding during the bonding process. That is, when the bonding structure 30 is torn off from the cover plate 20 and the display panel 10, it avoids that the debris of the bonding structure 30 remains on the display panel 10 and the cover plate 20 in a large area, and it facilitates the re-bonding of the display panel 10 and the cover plate 20. Since the bonding structure 30 is arranged in the non-display area 102, even if there is a small amount of debris residue, it does not affect the final display effect of the display panel 10. In this way, it can avoid the waste of the entire display panel 10 and the cover plate 20 or the difficulty in cleaning due to the poor bonding of the bonding structure 30, thereby improving the product yield and reducing the cost.

In addition, since the cover plate 20 in this embodiment has a thickness of only about 3.2 mm to 4 mm, the cover plate 20 is thin, and then the cover plate 20 is easily deformed under great pressure. However, in this embodiment, since the bonding structure 30 bonds the non-display area 102 of the display panel 10 and the light-shielding area 202 of the cover plate 20 together, when the cover plate 20 is subjected to pressure (e.g., pressure generated during writing), the bonding structure can generate a certain tensile force for the cover plate, to balance part of the pressure subjected by the cover plate 20 or offset the pressure received by the cover plate 20, so as to improve the easy deformation of the cover plate 20. Then, the situation that the distance between the cover plate 20 and the display panel 10 is too close when the cover plate is subjected to pressure can be avoided, so as to improve the display effect of the display panel 10.

In the embodiment of the present disclosure, the bonding structure 30 can be disposed around the display area 101 of the display panel 10. The bonding structure 30, the cover plate 20 and the display panel 10 can enclose a cavity. The cavity can be filled with air. That is, the display module can be an air-fitted component.

The bonding structure 30 can be arranged around the display area 101 of the display panel 10, which can increase the bonding area between the display panel 10 and the cover plate 20, thereby ensuring the bonding stability between the display panel 10 and the cover plate 20. In addition, when the cover plate 20 is subjected to pressure, the bonding structure 30 can generate a certain tensile force at the surrounding of the cover plate 20, so as to further improve the situation that the cover plate 20 is easily deformed under pressure and improve the display effect.

As shown in FIG. 1, the gap s between the bonding structure 30 and the display area can be 0 to 2 mm. This design can ensure the bonding area so as to improve the bonding stability, and at the same time can prevent the bonding structure 30 from being exposed to affect the display, to improve the display effect. Further, the inventor found through tests that when the gap s between the bonding structure 30 and the display area 101 of the display panel 10 is 0.5 mm to 1.5 mm, for example 0.5 mm, 0.8 mm, 1 mm, 1.3 mm, 1.5 mm, etc., it can better prevent the user from viewing the bonding structure 30 from the side, so that the display effect can be improved; and it can also leave a sufficient area in the non-display area 102 of the display panel 10 to be bonded to the bonding structure 30, so as to ensure the bonding stability between the cover plate 20 and the display panel 10.

Optionally, as shown in FIG. 1, the width w of the bonding structure 30 may be 4 mm to 15 mm, so as to ensure the bonding stability between the cover plate 20 and the display panel 10. Further, the inventor found through tests that when the width w of the bonding structure 30 is 6 mm to 8 mm, for example, 6 mm, 6.5 mm, 7 mm, 7.5 mm, 8 mm, etc., it can avoid poor bonding due to too small width, and it can also avoid high cost and small effective display area due to too large width. That is, when the width w of the bonding structure 30 is in the range of 6 mm to 8 mm, while increasing the effective display area, the bonding stability between the cover plate 20 and the display panel 10 can also be ensured. It should be noted that, the width in the embodiment of the present disclosure refers to the size in the arrangement direction of the non-display area 102 and the display area 101.

Figure 3:
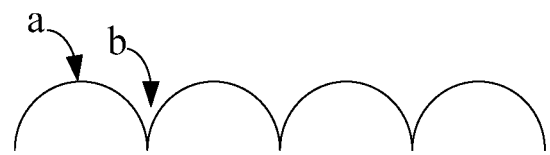
FIG. 3 shows a schematic structural diagram of an atomized surface according to an embodiment of the present disclosure.

In the embodiment of the present disclosure, since the thickness h of the bonding structure 30 is designed to be 0.8 mm to 1.0 mm, the bonding structure 30 is relatively thin, so that the air gap between the light-transmitting area 201 of the cover plate 20 and the non-display area 102 of the display panel 10 is relatively small. Therefore, in order to avoid the occurrence of color halos (a phenomenon similar to watermarks) due to the light-transmitting area 201 of the cover plate 20 being attached to the display area 101 of the display panel 10, the AG surface treatment may be performed with respect to the surface of the cover plate 20 facing the display panel 10 or the surface of the display panel 10 facing the cover plate 20 in the embodiments of the present disclosure. The AG surface treatment process refers to performing fine concave-convex processing on the surface of the object, for example, the cover plate 20 or the upper polarizer 104. That is, the surface of the cover plate 20 facing the display panel 10 or the surface of the display panel 10 facing the cover plate 20 can be an atomized surface. As shown in FIG. 3, the atomized surface has a plurality of convex portions a, and a concave portion b is formed between adjacent convex portions a.

For example, the cover plate 20 is toughened glass and the display panel 10 is a liquid crystal panel. The surface of the toughened glass facing the upper polarizer 104 or the surface of the upper polarizer 104 facing the toughened glass can be designed as an atomized surface.

The haze of the aforementioned atomized surface may be 15% to 30%. Optionally, the haze of the atomized surface may be 18% to 25%, for example, 18%, 20%, 23%, 25% %, etc. This design can ensure the imaging effect while avoiding the phenomenon of color halo, thereby improving the display effect.

In the embodiment of the present disclosure, since the composition of the cover plate 20 and the display panel 10 is different, the expansion and contraction of the cover plate 20 and the display panel 10 are different under the high temperature or low temperature test. At this time, there will be certain displacement between the cover plate 20 and the display panel 10. Based on this, the bonding structure 30 of the present disclosure needs to have certain buffering performance while realizing the bonding of the display panel 10 and the cover plate 20. That is, the bonding structure may include a buffer layer, to provide margin for the displacement of the cover plate 20 and the display panel 10 under high temperature and low temperature conditions, so as to ensure the bonding stability of the cover plate 20 and the display panel 10 under high temperature and low temperature conditions, and improve the product reliability. In order to make the bonding structure 30 have good buffering performance, the Shore hardness of the bonding structure 30 should not exceed 80 degrees. On the other hand, in order to ensure the support strength of the bonding structure 30, so as to ensure that the gap between the cover plate 20 and the display panel 10 can be maintained within a specified range after bonding, the Shore hardness of the bonding structure 30 can also be not less than 30 degrees. That is, the Shore hardness of the bonding structure 30 may be 30 degrees to 80 degrees. Further, the inventor found through tests that when the Shore hardness of the bonding structure 30 is 40 degrees to 60 degrees, for example, 40 degrees, 45 degrees, 50 degrees, 55 degrees, 60 degrees, etc., it can avoid poor buffering performance due to too large hardness, and can also avoid poor support due to too small hardness. That is to say, when the Shore hardness of the bonding structure 30 is 40 degrees to 60 degrees, while ensuring good supporting performance, it can better provide buffering, so as to improve the product yield.

Figure 4A:
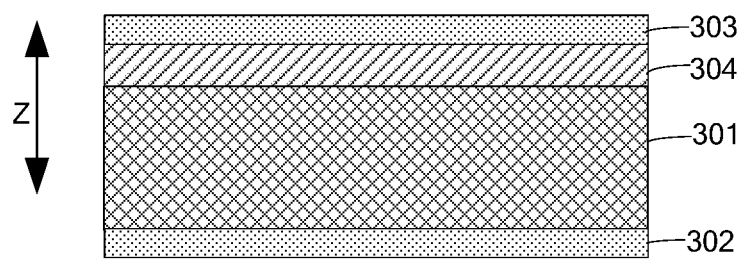
FIG. 4a shows a schematic structural diagram of the bonding structure according to an embodiment of the present disclosure.

For example, as shown in FIG. 4a, the buffer layer of the bonding structure 30 is the first buffer foam 301. In order to make the Shore hardness of the bonding structure 30 meet the above requirements, the Shore hardness of the first buffer foam 301 can be 30 degrees to 80 degrees. Further, the shore hardness of the first buffer foam 301 can be 40 degrees to 60 degrees, so as to ensure good supporting performance, make the gap between the cover plate 20 and the display panel 10 to maintain within the specified range, and at the same time, it can also have a good buffering capacity. In addition, since the cover plate 20 and the display panel 10 have different materials and thicknesses, and have different expansion and contraction coefficients under high temperature or low temperature conditions, the inventor found through tests that when the Shore hardness of the first buffer foam 301 is 40 degrees to 60 degrees, it can also provide an elastic margin for the relative displacement caused by the expansion or contraction of the cover plate and the display panel under high temperature or low temperature, so as to ensure stable bonding between the cover plate 20 and the display panel 10 under high temperature and low temperature conditions, and improve product reliability.

Figure 4B:
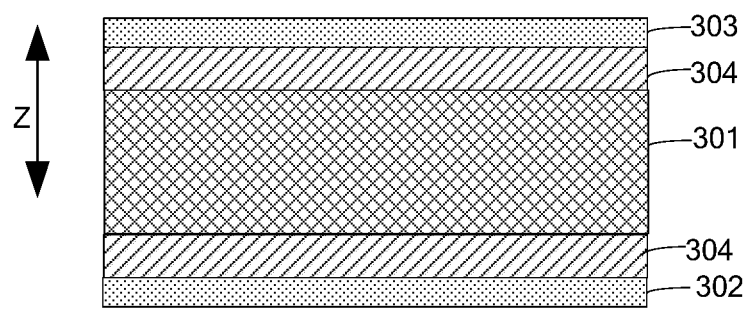
FIG. 4b shows a schematic structural diagram of the bonding structure according to another embodiment of the present disclosure.

Specifically, as shown in FIGS. 4a and 4b, the bonding structure 30 further includes a first adhesive layer 302, a second adhesive layer 303 and at least one supporting layer 304. The first adhesive layer 302 is disposed on a side of the first buffer foam 301 close to the display panel, and bonded with the display panel. The second adhesive layer 303 is disposed on a side of the first buffer foam 301 close to the cover plate, and bonded to the cover plate. The at least one supporting layer 304 is disposed between the first adhesive layer 301 and the first buffer foam 301 and/or between the second adhesive layer 303 and the first buffer foam 301.

In the embodiment of the present disclosure, the support strength of the bonding structure 30 can be improved by providing the supporting layer 304, so that the gap between the cover plate 20 and the display panel 10 can be maintained within a prescribed range.

In an optional embodiment, as shown in FIG. 4a, the aforementioned supporting layer 304 is disposed between the second adhesive layer 303 and the first buffer foam 301.

In another optional embodiment, as shown in FIG. 4b, while the aforementioned supporting layer 304 is disposed between the second adhesive layer 303 and the first buffer foam 301, the aforementioned supporting layer 304 may also be disposed between the second adhesive layer 303 and the first buffer foam 301.

The material of the supporting layer 304 can be polyethylene terephthalate (PET), and the material of the first adhesive layer 302 and the second adhesive layer 303 can be PET adhesive material. This design improves the bonding stability between the bonding structure 30 and the cover plate 20, the display panel 10, and also facilitates rework. That is, when the bonding structure 30 is torn off from the cover plate 20 and the display panel 10, it can avoid the situation that the bonding structure 30 is not torn cleanly, resulting in the existence of debris on the display panel 10 and the cover plate 20, which ensures the cleanliness of the display panel 10 and the cover plate 20, thereby facilitating the re-bonding of the display panel 10 and the cover plate 20. It can also avoid the situation that the entire display panel 10 and the cover plate 20 is wasted or the cleaning is too difficult due to poor bonding of the bonding structure 30, thereby improving product yield and reducing the cost.

In this embodiment, during the 180° peel test, the adhesive force of the bonding structure 30 may be greater than 1300 g/inch, to ensure the bonding stability between the cover plate 20 and the display panel 10.

It should be noted that, the bonding structure 30 in this embodiment may be defined as a double-sided adhesive structure.

Optionally, the thickness of the supporting layer 304 may be 0.04 mm to 0.35 mm, for example, 0.04 mm, 0.1 mm, 0.2 mm, 0.3 mm, 0.35 mm, etc. This design can prevent the thickness of the supporting layer 304 from being too thin to guarantee the support strength of the bonding structure 30. The design can also avoid poor buffering performance of the bonding structure 30 caused by too thick thickness of the supporting layer 304. That is, by designing the thickness of the supporting layer 304 as 0.04 mm to 0.35 mm, it can ensure the support strength of the bonding structure 30, and meanwhile, the buffering performance of the bonding structure 30 can also be improved.

In an embodiment of the present disclosure, the thickness of the supporting layer 304 may be approximately 0.1 mm, and the thickness of the first adhesive layer 302 and the second adhesive layer 303 may be approximately 0.05 mm. As shown in FIG. 4a, when the bonding structure 30 has only one supporting layer 304, the thickness of the first buffer foam 301 may be 0.6 to 0.8 mm, such as 0.6 mm, 0.65 mm, 0.7 mm, 0.75 mm, 0.8 mm, etc. As shown in FIG. 4b, when the bonding structure 30 has two supporting layers 304, the thickness of the first buffer foam 301 may be 0.4 to 0.6 mm, such as 0.4 mm, 0.45 mm, 0.5 mm, 0.55 mm, 0.6 mm, etc. Based on this, it can be known that the thickness of the foam layer occupies more than half of the thickness of the bonding structure 30.

Figure 5:
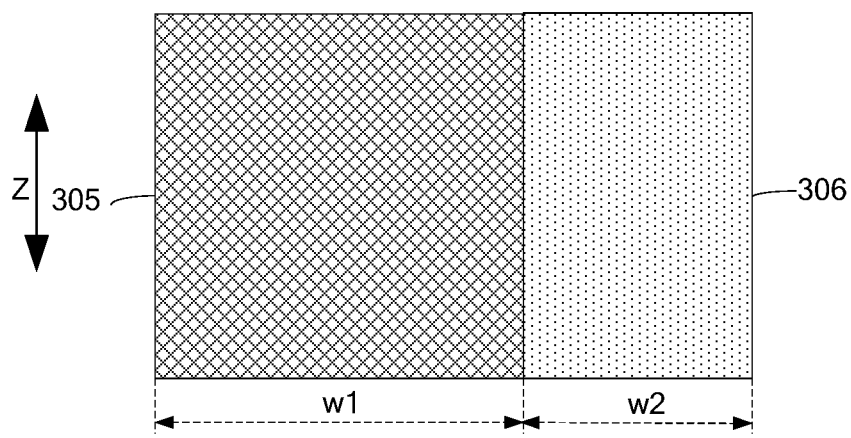
FIG. 5 shows a schematic structural diagram of the bonding structure according to still another embodiment of the present disclosure.

In another embodiment of the present disclosure, as shown in FIG. 5, the aforementioned buffer layer may be a silicon layer 305, and the Shore hardness of the silicon layer 305 may be 40 degrees to 60 degrees. While ensuring that the bonding structure has good supporting performance, so that the gap between the cover plate 20 and the display panel 10 can be maintained within a specified range, it can also have good buffering capacity. One side of the silicone layer 305 is bonded to the cover plate through an adhesive material, and the other side of the silicone layer 305 contacts with the display panel 10. The silicone layer 305 has a first side surface close to the display area 101 and a second side surface away from the display area 101.

In this embodiment, the bonding structure 30 may further include an optical adhesive 306 bonded to the cover plate 20 and the display panel 10. The optical adhesive 306 is bonded to the first side surface and/or the second side surface of the silicone layer 305. The opposite two sides of the optical adhesive 306 in the thickness direction Z of the display panel 10 are respectively bonded to the cover plate 20 and the display panel 10, to ensure the bonding stability between the cover plate 20 and the display panel 10.

It should be noted that the aforementioned optical adhesive 306 may be in a liquid state similar to toothpaste before being heated and cured. Based on this, the bonding process between the display panel 10 and the cover plate 20 may be as follows: bonding the silicone layer 305 on the light-shielding area 202 of the cover plate 20, and applying the liquid optical adhesive 306 to the side of the silicone layer 305 close to the display area 101 and/or the side of the silicone layer 305 away from the display area 101; then attaching it to the display panel 10; and then heating the liquid optical adhesive 306 to cure it, so that the display panel 10 and the cover plate 20 are bonded together.

The ratio between the width w1 of the silicone layer 305 and the width w2 of the optical adhesive 306 is 1 to 3, such as 1, 1.5, 2, 2.5, 3, etc. That is, the width w1 of the silicone layer 305 may be ½ to ¾ of the width w of the bonding structure 30, and the width w2 of the optical adhesive 306 may be ¼ to ½ of the width w of the bonding structure 30. For example, when the width w of the bonding structure 30 is 6 mm, the width w1 of the silicone layer 305 may be 4.5 mm, and the width w2 of the optical adhesive 306 may be 1.5 mm. Alternatively, when the width w of the bonding structure 30 is 8 mm, the width w1 of the silicone layer 305 may be 6 mm, and the width w2 of the optical adhesive 306 may be 2 mm; and so on.

In the embodiment of the present disclosure, by designing the ratio between the width w1 of the silicone layer 305 and the width w2 of the optical adhesive 306 according to the aforementioned requirements, it can ensure that the bonding gap between the cover plate 20 and the display panel 10 meets the requirements, and meanwhile, the bonding stability between the cover plate 20 and the display panel 10 can also be improved.

Based on the foregoing, the manufacturing process of the display module according to an embodiment of the present disclosure may include: attaching a bonding structure 30 with a thickness of 0.8 mm to 1.0 mm on the light-shielding area 202 of the toughened glass, and the bonding structure 30 is a mouth-shaped, and provided around the light-transmitting area 201; then, after placing the toughened glass in the limiting jig, attaching the non-display area 102 of the liquid crystal panel with the toughened glass through the jig, to obtain the air fully-fitted component. The thickness of the air layer in the air fully-fitted component is the thickness of the bonding structure 30, and this design can reduce the cost.

An embodiment of the present disclosure further provides an electronic apparatus. With reference to FIGS. 1 to 6, the electronic apparatus may include a border 40, an infrared touch component 50 and a display module.

The display module is the display module described in any one of the above implementations, and details are not repeated here.

The border 40 is arranged around edges of the display module. The border 40 has an accommodation cavity 401 and a light inlet-outlet 402. The light inlet-outlet 402 is located at a side of the accommodation cavity 401 close to the cover plate 20 and in communication with the accommodation cavity 401, and the light inlet-outlet 402 is located at a light emitting side of the cover plate 20. It should be noted that the light emitting side of the cover plate 20 is the side away from the display panel 10.

For example, the border 40 can be formed by splicing four sub-borders connected end to end, and each sub-border has an accommodation cavity 401 and a light inlet-outlet 402. It should be noted that each sub-border can be of integrated extrusion molding.

The infrared touch component 50 is located in the accommodating cavity 401. The infrared touch component 50 receives or emits infrared light through the light inlet-outlet 402, to form a crisscrossed infrared detection matrix network at the light emitting side of the cover plate 20.

Figure 7:
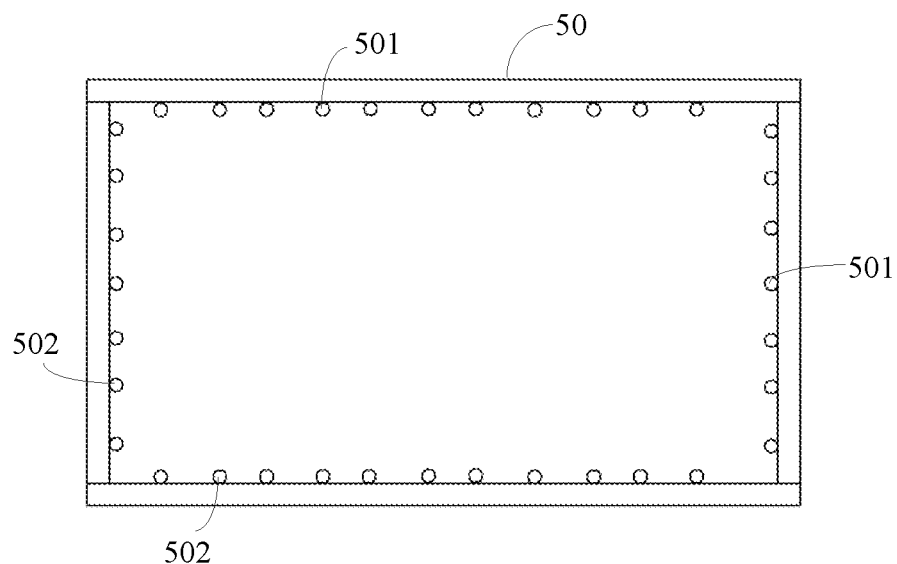
FIG. 7 shows a schematic plan view of an infrared touch component in an electronic apparatus according to an embodiment of the present disclosure.

For example, as shown in FIG. 7, the infrared touch component 50 includes a plurality of infrared transmitters 501 and a plurality of infrared receivers 502. The infrared transmitters 501 are used for emitting infrared light, and the infrared receivers 502 are used for receiving infrared light. The infrared transmitters 501 and the infrared receivers 502 are arranged on opposite sides of the cover plate 20, to form a crisscrossed infrared detection matrix network at the light emitting side of the cover plate 20. At this time, when a touch body such as a finger touches the light emitting side of the cover plate 20, the infrared light at the touch position will change. The change of the infrared light can be sensed by the infrared receiver 502, so that the touch position can be determined, that is, the touch function is realized.

Figure 6:
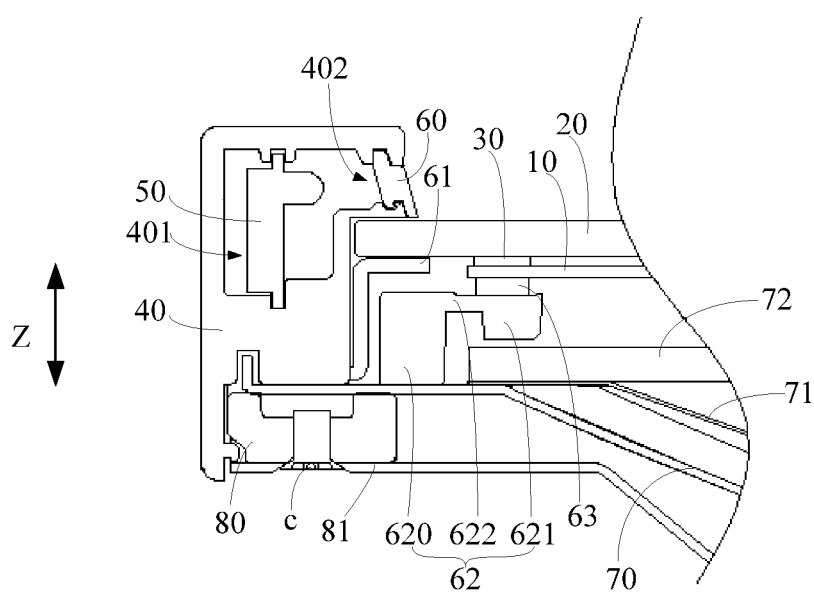
FIG. 6 shows a schematic diagram of a partial structure of an electronic apparatus according to an embodiment of the present disclosure.
Figure 8:
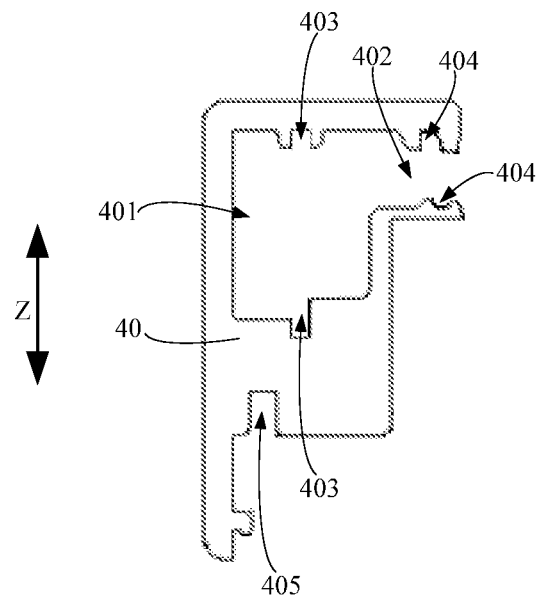
FIG. 8 is a schematic structural diagram of the border of the electronic apparatus shown in FIG. 6.

In combination with FIG. 6 and FIG. 8, first limiting grooves 403 are respectively provided on two opposite wall surfaces of the accommodating cavity 401 in the thickness direction Z of the display panel 10. The opposite two ends of the infrared touch component 50 in the thickness direction Z of the display panel 10 are respectively inserted into the first limiting grooves 403, so as to limit the position of the infrared touch component 50 and ensure the assembly stability of the infrared touch component 50.

In an embodiment of the present disclosure, the electronic apparatus may further include a filter strip 60 60. The filter strip 60 may be disposed at the light inlet-outlet 402. It should be understood that the filter strip 60 can be an infrared-transmitting filter strip, which is mainly used to filter out stray light such as visible light, and transmit as much infrared light as possible. The material of the filter strip 60 can include organic materials such as PC (polycarbonate) or PMMA (polymethyl methacrylate).

Specifically, in combination with FIG. 6 and FIG. 8, second limiting grooves 404 are respectively provided on two opposite wall surfaces of the light inlet-outlet 402 in the thickness direction Z of the display panel 10. The opposite two ends of the filter strip 60 in the thickness direction Z of the display panel 10 are respectively inserted into the second limiting grooves 404, so as to limit the position of the filter strip 60 and ensure the assembly stability of the filter strip 60.

In addition, the electronic apparatus according to the embodiment of the present disclosure may further include a pressing sheet 61, a rubber frame 62, a second buffer foam 63, a backlight assembly and a rear case.

The pressing sheet 61 is located on a side of the cover plate 20 close to the display panel 10 and supports the light-shielding area 202 of the cover plate 20. The pressing sheet 61 is connected with the border, such that the cover plate 20 is supported on the border 40. In detail, the pressing sheet 61 is an integral structure, and it can be Z-shaped as a whole. One end of the pressing sheet 61 can be inserted into the border 40 and connected with the border 40 by screws or bolts, and the other end of the pressing sheet 61 can be located on a side of the cover plate 20 close to the display panel 10 and attached with the light-shielding area 202 of the cover plate 20, to support the cover plate 20. It should be noted that there is a gap between the pressing sheet 61 and the display panel 10, to avoid interference between the display panel 10 and the pressing sheet 61 during the assembly process.

The backlight component may be located on a side of the display panel 10 and the pressing sheet 61 away from the cover plate 20, and connected with the border 40. In detail, the backlight component includes a back plate 70, a reflective sheet 71 and an optical film sheet 72 sequentially disposed on the side of the back plate 70 close to the display panel 10. The edge of the back plate 70 can be positioned and inserted into the third limiting groove 405 of the border 40 first, and then the back plate 70 and the border 40 are connected by means of screws or bolts. The edge of the optical film sheet 72 and the reflective sheet 71 can rest on the back plate 70.

The rubber frame 62 is located between the backlight component and the display panel 10. As shown in FIG. 6, the rubber frame 62 includes a first part 620, a second part 621 located on a side of the first part 20 close to the display panel 10, and a transition part 622 connecting the first part 620 and the second part 621. The first part 620 is supported on the backlight component. Specifically, the first part 620 is supported on the back plate 70. An orthographic projection of the second part 621 on the reference plane is located within an orthographic projection of the non-display area 102 of the display panel 10 on the reference plane, and a gap exists between the second part 621 and the backlight component. Specifically, there is a gap between the second part 621 and the optical film sheet 72. It should be noted that, the rubber frame 62 can be an integral structure as a whole.

The two opposite sides of the second buffer foam 63 in the thickness direction Z of the display panel 10 respectively contact with the display panel 10 and the second part 621.

The rear case can be located on a side of the backlight component away from the display panel 10, and connected with the border 40. Specifically, the rear case may be located at the side of the back plate 70 away from the display panel 10. A support bar 80 is also provided between the rear case 81 and the back plate 70. The support bar 80 is located at the edge of the back plate 70. As shown in FIG. 6, the support bar 80 and the rear case 81 can be connected by a structure such as a screw c.

It should be understood that, the electronic apparatus in the embodiment of the present disclosure is not limited to include the aforementioned structures, and may also include other structures, such as structures such as a power supply, a circuit board, and the like.

The electronic apparatus in the embodiment of the present disclosure may be a tablet computer, a flat-panel TV, and the like.

Other embodiments of the present disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or conventional technical means in the technical field not disclosed by this disclosure. The specification and embodiments are to be regarded as exemplary only, with the true scope and spirit of the disclosure being indicated by the appended claims.

What is claimed is:

1. An electronic apparatus, comprising:
   a display panel, having a display area and a non-display area arranged around the display area;
   a cover plate, located on a display side of the display panel, wherein the cover plate has a light-shielding area; and
   a bonding structure, located between the display panel and the cover plate, and two opposite sides of the bonding structure in a thickness direction are respectively bonded to the display panel and the cover plate, a thickness of the bonding structure is 0.4 mm to 2.0 mm, wherein the orthographic projection of the bonding structure on the reference plane is located within the orthographic projection of the light-shielding area on the reference plane, and the reference plane is a plane perpendicular to the thickness direction of the display panel,
   wherein the bonding structure comprises a buffer layer, the buffer layer is a first buffer foam, the Shore hardness of the first buffer foam is 40 degrees to 60 degrees; a first adhesive layer, disposed on a side of the first buffer foam close to the display panel, and bonded with the display panel; a second adhesive layer, disposed on a side of the first buffer foam close to the cover plate, and bonded to the cover plate; at least one supporting layer, disposed according to at least one of the following manners: between the first adhesive layer and the first buffer foam, and between the second adhesive layer and the first buffer foam, a thickness of the supporting layer is 0.04 mm to 0.35 mm;
   a border, arranged around edges of the cover plate, wherein the border has an accommodation cavity and a light inlet-outlet, the light inlet-outlet is located at a side of the accommodation cavity close to the cover plate and in communication with the accommodation cavity, and the light inlet-outlet is located at a light emitting side of the cover plate; and
   an infrared touch component, located in the accommodating cavity, wherein the infrared touch component receives or emits infrared light through the light inlet-outlet.

2. The electronic apparatus according to claim 1, wherein a thickness of the cover plate is smaller than 4.5 mm.

3. The electronic apparatus according to claim 1, wherein the supporting layer is a polyethylene terephthalate film layer.

4. The electronic apparatus according to claim 1, wherein, the buffer layer is a silicon layer, and a Shore hardness of the silicon layer is 40 degrees to 60 degrees, one side of the silicon layer is bonded to the cover plate through an adhesive material, and the silicon layer has a first side surface close to the display area and a second side surface away from the display area;
   the bonding structure further comprises an optical adhesive bonded to the cover plate and the display panel, and the optical adhesive is bonded to at least one of the first side surface and the second side surface.

5. The electronic apparatus according to claim 4, wherein a ratio between a width of the silicon layer and a width of the optical adhesive is 1 to 3.

6. The electronic apparatus according to claim 1, wherein the bonding structure is disposed around the display area, and the bonding structure, the cover plate and the display panel enclose a cavity, and the cavity is filled with air.

7. The electronic apparatus according to claim 6, wherein a gap between the bonding structure and the display area is 0 to 2 mm.

8. The electronic apparatus according to claim 6, wherein a width of the bonding structure is 4 mm to 15 mm.

9. The electronic apparatus according to claim 8, wherein the width of the bonding structure is 6 mm to 8 mm.

10. The electronic apparatus according to claim 1, wherein,
    first limiting grooves are respectively provided on two opposite wall surfaces of the accommodating cavity in the thickness direction;
    second limiting grooves are respectively provided on two opposite wall surfaces of the light inlet-outlet in the thickness direction;
    opposite two ends of the infrared touch component in the thickness direction are respectively inserted into the first limiting grooves;
    the electronic apparatus further comprises a filter strip, and opposite two ends of the filter strip in the thickness direction are respectively inserted into the second limiting grooves.

11. The electronic apparatus according to claim 10, further comprising:
    a pressing sheet, located on a side of the cover plate close to the display panel and supporting the light-shielding area, wherein the pressing sheet is connected with the border, and a gap exists between the pressing sheet and the display panel;
    a backlight component, located on a side of the display panel and the pressing sheet away from the cover plate, wherein the backlight component is connected with the border;
    a rubber frame, located between the backlight component and the display panel, wherein the rubber frame comprises a first part, a second part located on a side of the first part close to the display panel, and a transition part connecting the first part and the second part, the first part is supported on the backlight component, and an orthographic projection of the second part on the reference plane is located within an orthographic projection of the non-display area on the reference plane, and a gap exists between the second part and the backlight component;
    a second buffer foam, wherein two opposite sides of the second buffer foam in the thickness direction respectively contact with the display panel and the second part;
    a rear case, located on a side of the backlight component away from the display panel, and connected with the border.

* * * * *